United States Patent
Hoover et al.

(10) Patent No.: US 9,292,620 B1
(45) Date of Patent: Mar. 22, 2016

(54) RETRIEVING DATA FROM MULTIPLE LOCATIONS IN STORAGE SYSTEMS

(75) Inventors: Christopher Edward Hoover, Los Gatos, CA (US); Eric A. Anderson, Palo Alto, CA (US); Charles E. Christian, Jr., Basking Ridge, NJ (US); Tim Reddin, Galway (IE); Robert J. Souza, Windham, NH (US); Xiaozhou Li, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 2448 days.

(21) Appl. No.: 11/855,700

(22) Filed: Sep. 14, 2007

(51) Int. Cl.
   *G06F 17/30* (2006.01)
(52) U.S. Cl.
   CPC .... *G06F 17/30949* (2013.01); *G06F 17/30864* (2013.01)
(58) Field of Classification Search
   USPC .................................................. 707/10, 770
   See application file for complete search history.

(56) References Cited

U.S. PATENT DOCUMENTS

| | | | | |
|---|---|---|---|---|
| 7,194,002 | B2* | 3/2007 | Zhang et al. | 370/400 |
| 2002/0163882 | A1* | 11/2002 | Bornstein et al. | 370/227 |
| 2003/0031176 | A1* | 2/2003 | Sim | 370/392 |
| 2003/0115281 | A1* | 6/2003 | McHenry et al. | 709/213 |
| 2005/0149481 | A1* | 7/2005 | Hesselink et al. | 707/1 |
| 2005/0246393 | A1* | 11/2005 | Coates et al. | 707/200 |

OTHER PUBLICATIONS

Yang et al., Improving Search in Peer-to-Peer Networks, 2002, computer.org.*

* cited by examiner

*Primary Examiner* — Belix M Ortiz Ditren
(74) *Attorney, Agent, or Firm* — Law Office of Phillip Scott Lyren

(57) ABSTRACT

Embodiments include methods, apparatus, and systems for retrieving data from multiple locations in storage systems. One embodiment includes a method that determines that data is stored in multiple locations remote to a computer, estimates a latency to retrieve the data from the multiple locations, and requests the data from the plural locations.

15 Claims, 4 Drawing Sheets

RETRIEVING DATA FROM MULTIPLE LOCATIONS IN STORAGE SYSTEMS

BACKGROUND

Cache is memory that temporarily stores frequently accessed data. Once the data is stored in the cache, subsequent accesses cause the data to be retrieved from the cache as opposed to re-computing the original data or fetching it from a slower memory location. Caching enables data to be more quickly accessed to lower average access times.

Distributed storage systems use local caches to store remotely retrieved data. After a data request, a determination is made as to whether the data is located in a cache local to the requesting application. If the data is not in a local cache, then the data is retrieved from a central server or remote database. Accessing data from these locations is relatively slow, especially if the data is retrieved from a disk array or a different geographical location.

Storage systems can benefit from new uses of caching and fetching data to decrease access times to data.

DETAILED DESCRIPTION

Embodiments are directed to apparatus, systems, and methods for caching and fetching data from multiple different locations in storage systems. Exemplary embodiments are directed to peer-to-peer collaborative caching wherein peers maintain a distributed cache of items that are persistently stored on one or more origin or database servers. Collaborative caching is applicable to many distributed systems having a large dataset (i.e., larger than a working memory of a single peer).

Rather than directly sending requests to an origin or database server to retrieve data, the peer first examines its local cache for the data. If the data is not locally stored in its cache, then the peer simultaneously queries multiple remote locations for the data. These remote locations include, but are not limited to, other peer memory, the local disk of the peer, the local disk of other peers, the cache and/or disks of the origin or database servers.

In one embodiment, the peer estimates latency and bandwidth at which data will arrive from one of more of its local disk, a remote peer, and an origin or database server. The peer includes a recent estimate of the utilization of the remote peers or nodes and origin or database servers to estimate, predict, or project latencies for retrieving requested data.

Figure 1:
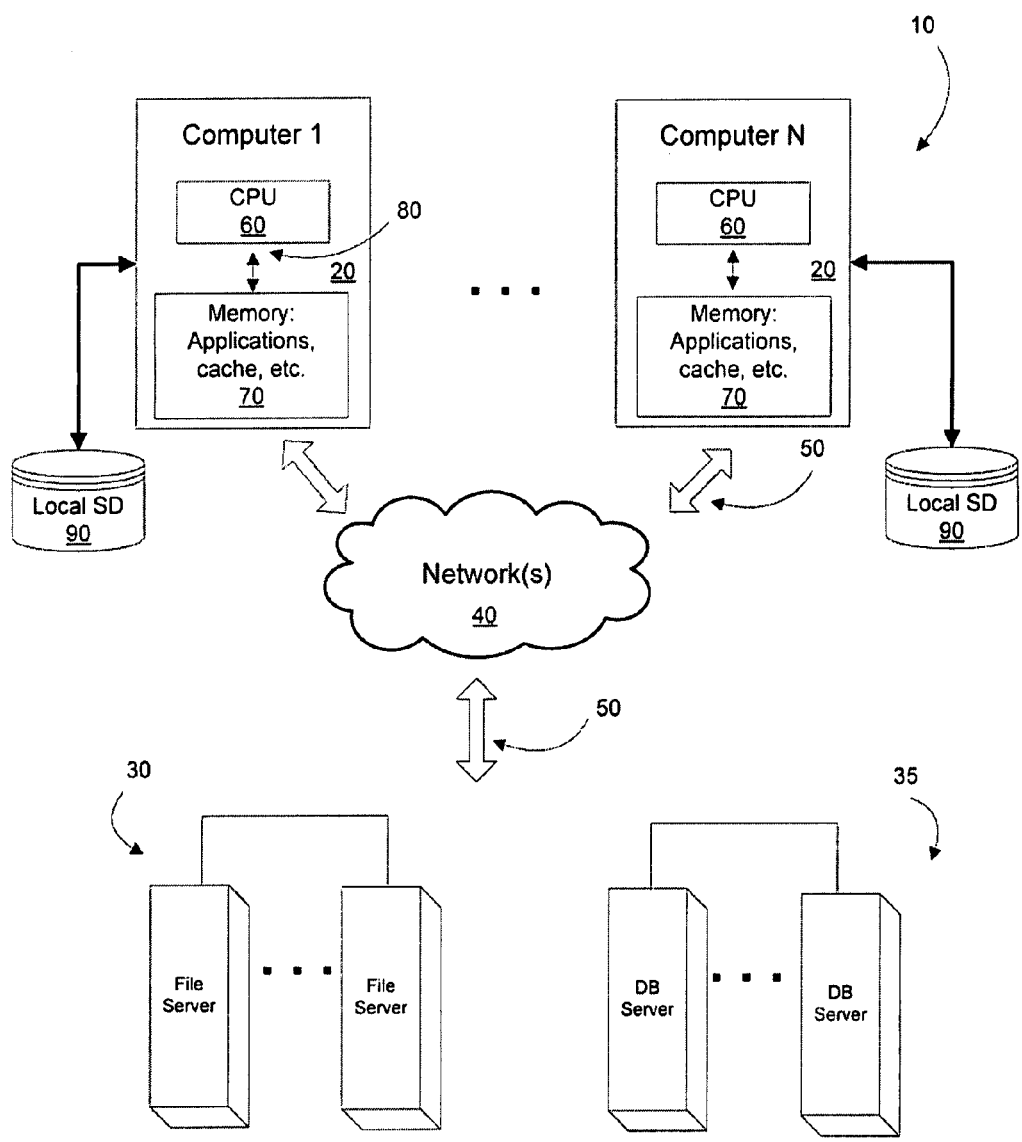
FIG. 1 is a block diagram of a storage system in accordance with an exemplary embodiment.

FIG. 1 illustrates an exemplary storage system 10 utilizing embodiments in accordance with the invention. The system 10 includes one or more computers 20 (such as clients, host computers, workstations, or peers in a peer-to-peer network, shown as computer 1 through computer N) connected to one or more file and/or cache servers 30 (shown as file server 1 through file server N) and one or more origin or database servers 35 (shown as database server 1 through database server N). The computers 20 and servers 30/35 communicate through one or more networks 40 along communication paths 50.

The computers 20 comprise a processing unit 60 (such as one or more processors or central processing units, CPUs) for controlling the overall operation of memory 70 (such as random access memory (RAM) for temporary data storage and local disk for permanent data storage). The memory 70 stores data, applications, daemons, control programs, and other data associate with computers 20. The processing unit 60 communicates with memory 60 and many other components via buses 80. One or more local storage devices 90 are coupled to each of the computers 20.

The peers and their local storage devices store and share data among the peers in the storage system to form a collaborative peer-to-peer network. Data is directly exchanged between peers without requiring the data to be retrieved from a central server or central storage device. In one embodiment, peers also obtain data from one or more central servers or central storage devices.

Embodiments in accordance with the present invention are not limited to any particular type or number of computers, servers, or computer systems. These devices, for example, include various portable and non-portable computers and/or electronic devices, such as servers, mainframe computers, distributed computing devices, laptops, and other electronic devices and systems whether such devices and systems are portable or non-portable.

In one exemplary embodiment, the computers 20 (such as client or peer computers) initiate jobs, which in turn result in many reads or writes from and to other peers or the database servers. The origin or database servers 35 store millions of files or terabytes of data and are geographically located away from the client computers (for example, the database servers are located in a remote data center).

Figure 2:
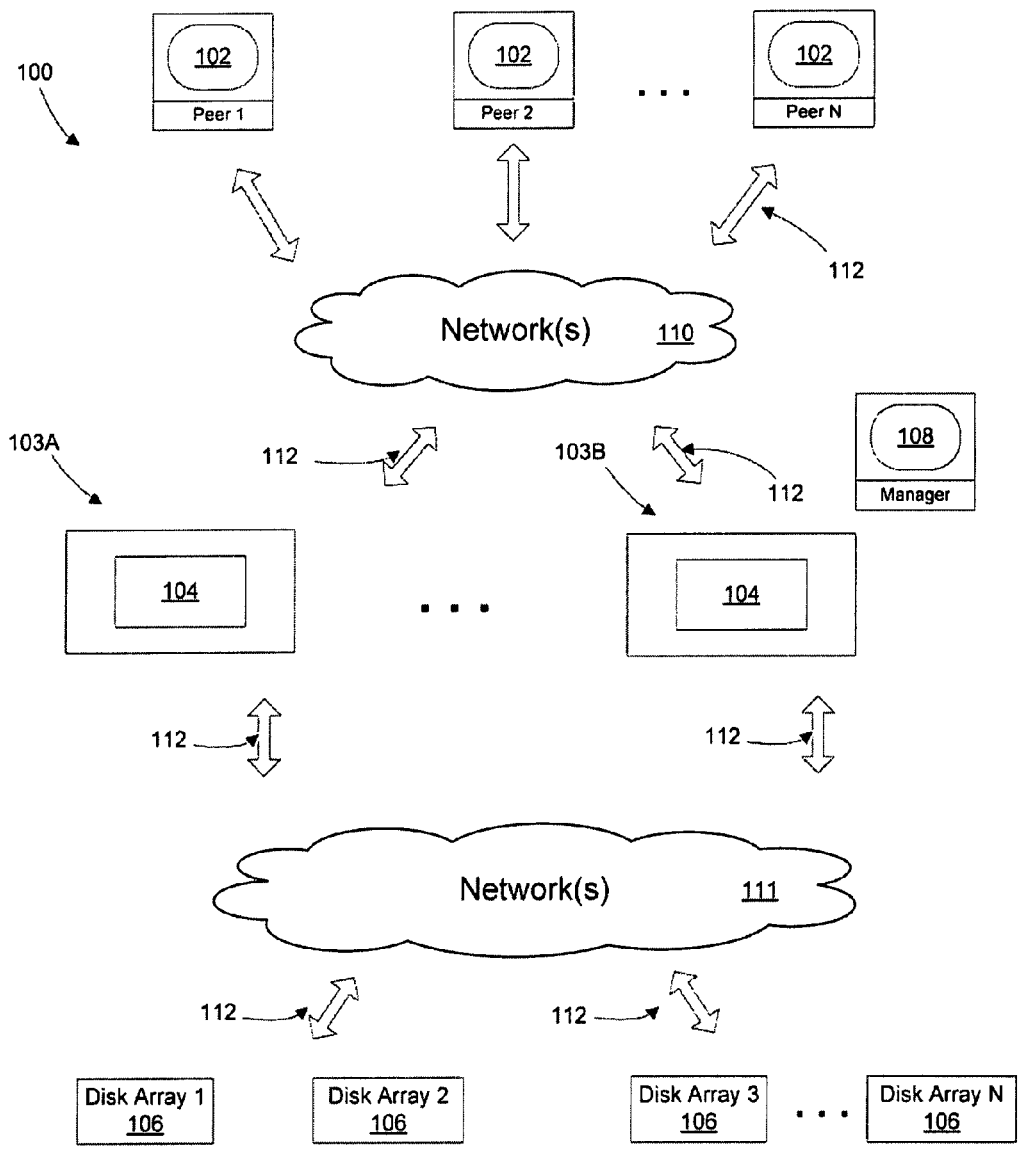
FIG. 2 is another block diagram of a storage system in accordance with an exemplary embodiment.

FIG. 2 is a block diagram of an exemplary distributed file or storage system 100 in accordance with an exemplary embodiment of the invention. By way of example, the system includes one or more of a cluster storage network, local area network (LAN), and/or a storage area network (SAN) that includes a plurality of hosts, peers, or client computers 102 and one or more servers, storage devices, or arrays 103A, 103B that include one or more storage controllers 104, a plurality of storage devices 106 (shown by way of example as disk array 1 to disk array N), and a manager 108 (example, one or more file servers) in communication with the controllers and storage devices.

The hosts, peers, or client computers 102 (shown as peer 1 to peer N) and manager 108 are coupled to the controllers 104 through one or more fabrics or networks 110, and the controllers 104 are coupled to the storage devices 106 through one or more fabrics or networks 11. For instance, the peers communicate with each other and/or with a controller through one or more networks. By way of example, networks 110 and 111 include one or more of the Ethernet, fibre channel (FC), serial attached SCSI (SAS), iSCSI, internet, local area network (LAN), wide area network (WAN), public and/or private networks, etc. Communications links 112 are shown in the figure to represent communication paths or couplings between the hosts, controllers, and storage devices.

In one embodiment the storage devices 103A, 103B are disk arrays. Each disk array can have one or more controllers. For instance, an array has two controllers for redundancy.

In one embodiment, storage devices 103A, 103B are physically located in a same data center. In another embodiment, the storage devices are located a great geographical distance apart in separate data centers. Further, although only two storage devices are shown, a SAN can include hundreds or thousands of such storage devices.

Figure 3A:
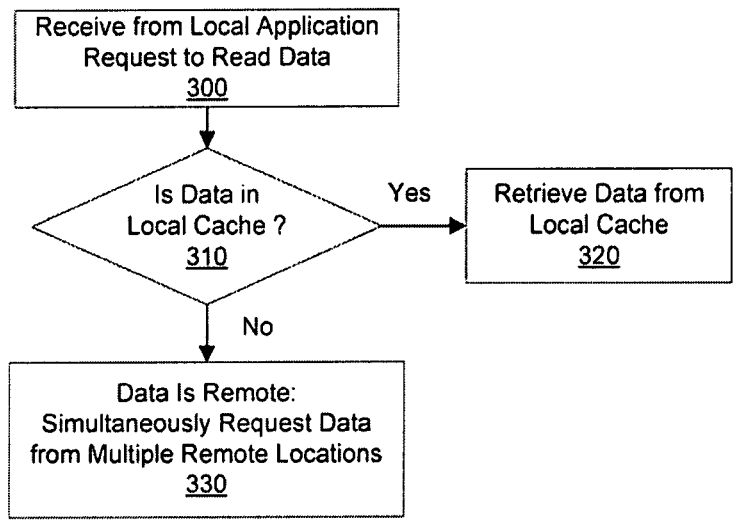
FIG. 3A is a flow diagram for caching and fetching data in accordance with an exemplary embodiment.

FIG. 3A is a flow diagram in accordance with an exemplary embodiment for caching and fetching data in a storage system. The method is described in the context of a storage system using peer-to-peer collaborative caching.

According to block 300, a peer (i.e., a computer) receives a request from a local application to read or retrieve data. By way of example, an application executing on the peer requests data.

After receiving the request, the peer first checks to determine if the requested data is located in its own cache. In other words, the peer determines whether the data is in local cache according to block 310. If the answer to this question is "yes" then the requested data is retrieved from the local cache of the peer according to block 320. If the answer to this question is "no" then the data is remote (i.e., not in the local cache of the peer).

According to block 330, the peer determines that the data is remote and then simultaneously requests the data from multiple remote locations. In other words, the peer requests at the same time several different computers or storage locations to return the data to the peer. By way of example, these different storage locations include, but are not limited to, one or more of a local disk or storage device connected to the peer, a cache of another peer, a local disk or storage device connected to another peer, a cache of a server (such as an origin or database server), and a disk array connected to an origin or database server. As discussed in connection with FIGS. 1 and 2, one or more these remote computers and storage devices can be located at geographical separate and different locations.

Simultaneously requesting the data from multiple different remote locations reduces latency while remotely retrieving the requested data. Latency is reduced since the requesting peer obtains the data or portions of the data from one or more different remote locations. For instance, even though several other storage locations have the data, the time to retrieve and transmit the data to the peer can widely vary. By way of example, a first storage location can be busy processing other requests or only have the data on its disks. A second storage location can have the data in its cache (retrieving from a local cache is much quicker than reading the data from a disk).

Exemplary embodiments thus change the method by which a peer finds and retrieves data. Rather than consulting peers for cached data and, then upon a cache miss, request the data from the file server, one exemplary embodiment simultaneously requests the data from multiple peer locations. Even though the data exists at multiple locations, each location can retrieve and return the data with different latency and bandwidth.

Figure 3B:
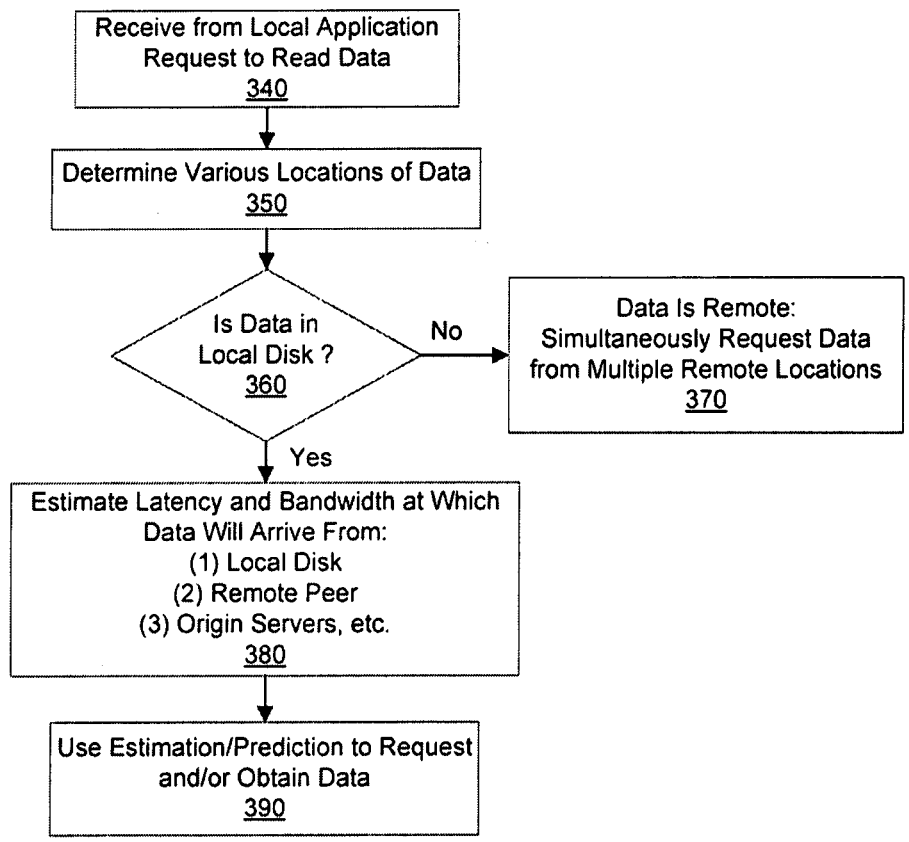
FIG. 3B is another flow diagram for caching and fetching data in accordance with an exemplary embodiment.

FIG. 3B is another flow diagram in accordance with an exemplary embodiment for caching and fetching data in a storage system. The method is described in the context of a storage system using peer-to-peer collaborative caching.

According to block 340, a peer (i.e., a computer) receives a request from a local application or other source to read or retrieve data. By way of example, an application executing on the peer requests data.

According to block 350, the peer determines where the data is located. For example, after a client node receives a local request to read data, the client node first determines where the data resides. Determining if the data resides locally is quick since the client node maintains a list of locally cached data. Determining if and where the data resides remotely is accomplished using one or more of multiple methods, such as consulting a distributed directory for all of the peers or consulting a centralized directory. Regardless, after receiving the data request, the peer determines a list of remote locations where the data resides.

According to block 360, a question is asked as to whether the requested data is located in a disk or storage device local to the peer. If the answer to this question is "no" then flow proceeds to block 370. Here, the data is remote, and the peer simultaneously requests the data from multiple remote locations (as discussed in connection with FIG. 3A). If the answer to this question is "yes" then flow proceeds to block 380.

When a peer is retrieving data from a remote peer or remote storage location, the client of peer can also have a copy of the data on its own local disk. In this instance, the peer can retrieve some or all of the data from its own local disk. At the same time, the peer can also request and retrieve the data from one or more remote locations by estimating latency and bandwidth by which the data will be received from such remote locations. In one embodiment, the requesting peer estimates or predicts the latency and bandwidth to retrieve some or all of the requested data from each remote storage location having some or all of the requested data. By way of example, these different remote storage locations include, but are not limited to, one or more of a local disk or storage device connected to the peer, a cache of another peer, a local disk or storage device connected to another peer, a cache of a server (such as an origin or database server), and a disk array connected to a origin or database server.

In one exemplary embodiment, if the requested data is stored on multiple remote peers, then the requesting peer partitions the remote requests among those multiple remote peers. As another embodiment, if the data only resides on remote/local disks, the requesting peer performs a calculation to read data from the multiple remote disks (including the origin or database server) and from the local disk.

Exemplary embodiments utilize cooperative peer-to-peer caching and fetching to minimize latency in retrieving data and reduce the overall load on the network (example, reduce the load on the origin file servers). Cooperative caching coordinates data stored on peers so data not located in the local cache of a peer can be retrieved at a remote cache of another peer. Exemplary embodiments also reduce the overhead of retrieving data on the requesting node. The average latency for data retrieval perceived by individual peers is lowered which, in turn, reduces processor wait time for data delivery and increases data throughput.

In one exemplary embodiment, if the requested data is stored on multiple remote clients/peers, then the requesting client node or peer partitions the remote requests among those multiple remote clients/peers. As another embodiment, if the data only resides on remote/local disks, the requesting client node or peer performs a calculation to read data from the multiple remote disks (including the origin or database server) and from the local disk.

Given the estimated delay (e.g. in seconds) for receiving 0 bytes from a source i of $d_i$, and an estimated rate for receiving data (e.g. in bytes/second) from that source of $r_i$, the calculation involves a series of equations $T_i = d_i + b_i/r_1$ and an equation $b = \text{sum}(b_i)$ where b is the number of bytes to retrieve and $T_i$ is the time it will take to retrieve the data from source i. The total time is minimized when $T_i$ is minimized so we can treat all of the $T_i$ as the same. This set of equations can be solved by substitution, or by a linear programming algorithm such as the simplex method. For example, in the simple case of two sources, substitution and arithmetic shows $b_1 = ((d_2-d_1)r_1 r_2 + r_1 b)/(r_1+r_2)$ and $b_2 = b - b_1$.

Exemplary embodiments utilize cooperative peer-to-peer caching and fetching to minimize latency in retrieving data and reduce the overall load on the network (example, reduce the load on the origin file servers). Cooperative caching coordinates data stored on clients or peers so data not located in the local cache of a client can be retrieved at a remote cache of another client or peer. Exemplary embodiments also reduce the overhead of retrieving data on the requesting node. The average latency for data retrieval perceived by individual nodes is lowered which, in turn, reduces processor wait time for data delivery and increases data throughput.

Figure 4:
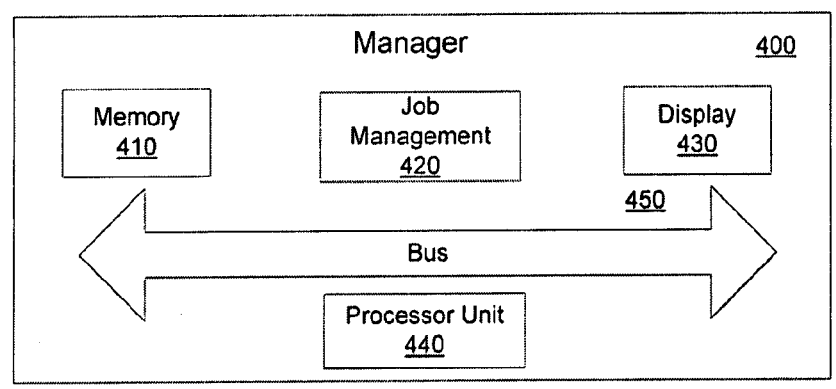
FIG. 4 is a block diagram of a manager in accordance with an exemplary embodiment.

FIG. 4 is a block diagram of a server or manager 400 in accordance with an exemplary embodiment of the present invention. In one embodiment, the manager is a computer that includes memory 410, job management software or algorithms 420, display 430 (optional), processing unit 440 and one or more buses 450.

In one embodiment, the processor unit includes a processor (such as a central processing unit, CPU, microprocessor, application-specific integrated circuit (ASIC), etc.) for controlling the overall operation of memory 410 (such as random access memory (RAM) for temporary data storage, read only memory (ROM) for permanent data storage, and firmware). The memory 410, for example, stores applications, data, programs, algorithms (including software to implement or assist in implementing embodiments in accordance with the present invention) and other data. The processing unit 440 communicates with memory 410 and display 430 via one or more buses 450.

In one exemplary embodiment, the manager functions as a directory server. In a network, for instance, the directory server tracks the locations of cached file contents in peers and informs peers where to find particular information stored across the network.

As used herein, the term "storage device" means any data storage device capable of storing data including, but not limited to, one or more of a disk array, a disk drive, a tape drive, optical drive, a SCSI device, or a fiber channel device. As used herein, a "disk array" or "array" is a storage system that includes plural disk drive, a cache, and controller. Arrays include, but are not limited to, networked attached storage (NAS) arrays, modular SAN arrays, monolithic SAN arrays, utility SAN arrays, and storage virtualization.

As used herein, "peer-to-peer" (or "P2P") is a computer network in which workstations or peers have equivalent capabilities and responsibilities and do not require a client-server architecture in which some computers are responsible for serving others. P2P networks use connections between computers or peers in a network with the cumulative bandwidth of network participants rather than conventional centralized resources where a relatively low number of servers provide the core value to a service or application. Peer-to-peer networks are typically used for connecting nodes via largely ad hoc connections and are used, for example, for file sharing. In a pure peer-to-peer network, peers do not have the notion of clients or servers, but only equal peer nodes that simultaneously function as both "clients" and "servers" to the other nodes on the network. This model of network arrangement differs from the client-server model where communication is usually to and from a central server. In a hybrid P2P network, a central server keeps track of information on peers and responds to requests for that information. Peers also host available information (i.e., store data for other peers and themselves) as a traditional central server. This hosted information is shared among the peers after a request. Exemplary embodiments are used in both pure P2P networks, hybrid P2P networks, variations of these networks, and other networks.

In one exemplary embodiment, one or more blocks or steps discussed herein are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. For instance, blocks in diagrams or numbers (such as (1), (2), etc.) should not be construed as steps that must proceed in a particular order. Additional blocks/steps may be added, some blocks/steps removed, or the order of the blocks/steps altered and still be within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method executed in a peer-to-peer computer network with a plurality of peer computers, comprising:
   receiving, at a peer computer in the peer-to-peer computer network, a request to retrieve data;
   determining by the peer computer that the data is stored across the peer-to-peer computer network in multiple peer computers having different locations remote to the peer computer; and
   simultaneously requesting by the peer computer the data from the multiple peer computers;
   retrieving the data from the multiple peer computers while simultaneously retrieving the data from a storage device local to the peer computer;

estimating by the peer computer a latency and a bandwidth to receive the data from each of the multiple peer computers; and reducing latency of receiving the data at the peer computer by requesting same data from each of the multiple peer computers.

2. The method of claim 1, wherein the data is stored in both cache memories of the multiple peer computers and a disk array coupled to a server.

3. The method of claim 1 further comprising, retrieving a first portion of the data from a first peer computer remote to the peer computer and a second portion of the data from a second peer computer remote to the peer computer.

4. The method of claim 1 further comprising, reading by the peer computer one of a distributed directory or a centralized directory to determine where the data resides in locations remote to the peer computer.

5. Physical media storing code that is executed by a processor of a computer to execute a method, comprising:

determining by a peer computer in a peer-to-peer network that data is stored in plural peer computers at multiple locations remote to the peer computer;

estimating, by the peer computer, a latency to retrieve the data from each of the plural peer computers at the multiple locations; and requesting, by the peer computer, the data from the plural peer computers at the multiple locations, wherein the latency to retrieve the data is reduced since same data is requested from each of the plural peer computers; and commencing an input/output (I/O) at the peer computer to read the data from a local disk while simultaneously sending a request for the data to the plural peer computers.

6. The physical media of claim 5 storing code that is further executed for: retrieving one portion of the data from a cache in one of the plural peer computers and a second portion of the data from a cache in another of the plural peer computers.

7. The physical media of claim 5 storing code that is further executed for: simultaneously requesting the data from the plural peer computers and a disk array connected to a server.

8. The physical media of claim 5 storing code that is further executed for: using previous requests for data from the plural peer computers in the peer-to-peer network to estimate the latency to retrieve the data from each of the plural peer computers.

9. The physical media of claim 5 storing code that is further executed for: calculating at the peer computer an amount of data that will arrive from the plural peer computers at a time when a disk input/output (I/O) begins to transfer the data to the peer computer.

10. The physical media of claim 5 storing code that is further executed for: calculating a fraction of the data readable from a disk local to the peer computer and a fraction of the data readable over the peer-to-peer network from the plural peer computers.

11. The physical media of claim 5 storing code that is further executed for:

receiving a request for the data from a local application executing on the peer computer;

partitioning requests for the data between the plural peer computers that have at least a portion of the data.

12. A storage system in a peer-to-peer computer network, comprising:

memory storing an algorithm; processor executing the algorithm to:

receive a request by an application for data; estimate a latency and bandwidth to retrieve same data from each of plural different non-local storage devices located across the peer-to-peer computer network;

request the same data from the plural different non-local storage devices, wherein the same data is simultaneously requested from each of the plural different non-local storage devices to reduce a latency in receiving the same data at a peer computer in the storage system; and wherein the processor further executes the algorithm to request the same data from the multiple different non-local storage devices while simultaneously retrieving the data from a storage device that is local to the processor.

13. The storage system of claim 12, wherein the processor further executes the algorithm to determine where the data is stored in the multiple different non-local storage devices.

14. The storage system of claim 12, wherein the processor further executes the algorithm to calculate a fraction of the data readable from memory local to the processor and a fraction of the data readable from storage devices remote to the processor over the peer-to-peer computer network.

15. The storage system of claim 12, wherein the multiple different non-local storage devices include a cache in a peer computer and a disk array connected to a server.

* * * * *